United States Patent
Lim (10) Patent No.: US 8,549,283 B2
(45) Date of Patent: Oct. 1, 2013

(54) SYSTEM AND METHOD OF TRANSMITTING/RECEIVING SECURITY DATA

(75) Inventor: Jin Seong Lim, Seoul (KR)

(73) Assignee: Koreacenter Co., Ltd., Seoul (KR)

( * ) Notice: Subject to any disclaimer, the term of this patent is extended or adjusted under 35 U.S.C. 154(b) by 1508 days.

(21) Appl. No.: 12/097,382

(22) PCT Filed: Feb. 21, 2008

(86) PCT No.: PCT/KR2008/001030
§ 371 (c)(1),
(2), (4) Date: Jun. 13, 2008

(87) PCT Pub. No.: WO2008/103000
PCT Pub. Date: Aug. 28, 2008

(65) Prior Publication Data
US 2010/0161962 A1 Jun. 24, 2010

(30) Foreign Application Priority Data
Feb. 23, 2007 (KR) .................. 10-2007-0018707
Feb. 19, 2008 (KR) .................. 10-2008-0015037

(51) Int. Cl.
*H04L 29/06* (2006.01)
*H04L 9/32* (2006.01)

(52) U.S. Cl.
USPC .................. 713/153; 713/168; 713/171

(58) Field of Classification Search
None
See application file for complete search history.

(56) References Cited

U.S. PATENT DOCUMENTS

| 6,148,405 | A | 11/2000 | Liao et al. |
| 6,643,701 | B1 | 11/2003 | Aziz et al. |
| 7,181,017 | B1 * | 2/2007 | Nagel et al. .................. 380/282 |
| 7,191,335 | B1 | 3/2007 | Maillard |
| 7,769,166 | B2 * | 8/2010 | Parveen et al. ................. 380/28 |
| 7,949,130 | B2 * | 5/2011 | Gueron et al. .................. 380/29 |

(Continued)

FOREIGN PATENT DOCUMENTS

| EP | 1 533 970 A1 | 5/2005 |
| JP | 2002-269350 | 9/2002 |

(Continued)

OTHER PUBLICATIONS

Office Action issued May 17, 2011, in Japanese Patent Application No. 2009-500305.

(Continued)

*Primary Examiner* — Azizul Choudhury
(74) *Attorney, Agent, or Firm* — Oblon, Spivak, McClelland, Maier & Neustadt, L.L.P.

(57) ABSTRACT

There are provided a security server for intermediating transmission/reception of security data between a service providing server and a user terminal, a security data transmission/reception system and a method. In order to intermediate the transmission/reception of security data between the service providing server and the user terminal, the security server may generate a session key corresponding to a secret key provided from a user terminal, receive security data together with the session key from a security data transmitter, encode the security data with the secret key corresponding to the session key, store the encoded security data, provide a data encryption key to the security data transmitter, decode the encoded security data with the secret key corresponding to the session key when the session key is received together with a security data request key from a security data receiver, and provide the decoded security data to the security data receiver.

6 Claims, 6 Drawing Sheets

(56) References Cited

U.S. PATENT DOCUMENTS

| | | |
|---|---|---|
| 2002/0029340 A1 | 3/2002 | Pensak et al. |
| 2002/0130176 A1 | 9/2002 | Suzuki |
| 2002/0184217 A1* | 12/2002 | Bisbee et al. ............ 707/9 |
| 2006/0173787 A1 | 8/2006 | Weber et al. |
| 2007/0033399 A1* | 2/2007 | Takeda ............ 713/168 |
| 2008/0031458 A1* | 2/2008 | Raja ............ 380/279 |

FOREIGN PATENT DOCUMENTS

| | | |
|---|---|---|
| JP | 2002-281012 | 9/2002 |
| WO | 00 46994 | 8/2000 |
| WO | 01 01644 | 1/2001 |
| WO | WO 01/37068 A2 | 5/2001 |

OTHER PUBLICATIONS

Extended Search Report issued Jul. 20, 2011 in Europe Application No. 08723068.6.

Ed Dawson, et al., "Key management in a non-trusted distributed environment", Future Generation Computer Systems. 16, 2000, pp. 319-329.

* cited by examiner

| Member Information | • You should fill in the checked items |
|---|---|

- Name : [Hong, Gil-Dong] ←— D1
- ID : OOOO
- Password : [        ]  Confirm password : [        ]
               D2                                D3

(Please make your ID and password by using combination of 2-12 letters and numbers)

- Residence registration number : [    ]-[●●●●]⑭ ←— D4
- E-mail : [            ] ←— D5
- Mail information : ⦿Yes ◯No
- SMS information : ⦿Yes ◯No
- Home telephone : [OO-△△△-□□□□] ←— D6
- Home address : [135]-[905] [✉ Zip code Search]
              [××Si OOGu □□Dong]  ⎫
- Detailed address : [△△ Beon-Ji]  ⎬ D7
                            ⎭

| Office telephone | : [        ] |
| Office address | : [  ][  ] [✉ Zip code Search] |
| | [                    ] |
| Cell phone | : [        ] |

Recommender ID : No recommender You are recommended by 0 person(s)

If you register a base address, the address is automatically inputted in purchasing goods.

SYSTEM AND METHOD OF TRANSMITTING/RECEIVING SECURITY DATA

TECHNICAL FIELD

The present invention relates to a system and method of transmitting/receiving data, and more particularly to a security data transmitting/receiving system including a security server for intermediating security data transmission/reception and a security data transmitting/receiving method using the same.

BACKGROUND ART

With the development of communication systems, a variety of information is shared and e-commerce, banking and certificate issuance such as a copy of the resident registration have been widely implemented in wire/wireless data communication environments. If a user terminal (client) such as a personal computer accesses an on-line market managing server, then a banking server or a public office server (hereinafter referred to as a service providing server) through open network such as Internet, data transmission/reception between the user terminal and the service providing server may be implemented. The user terminal and the service providing server may encode the data by using a secure sockets layer (SSL) to transmit and receive the data. This is so that information leakage may be prevented in advance from potential hacking.

However, the conventional SSL have a limitation in that a certificate should be installed on the service providing server. Further, additional ports have to be assigned so as to install a plurality of certificates on one service providing server, which increases the server capacity. Thus, it is not easy to manage the server from the perspectives of web-hosting providers or application server providers.

DISCLOSURE

[Technical Problem]
The limitation, which the certificates have to be installed on the service providing server, should be resolved.
[Technical Solution]
The present invention provides a security server for intermediating security data transmission/reception between a service providing server and a user terminal, a security data transmission/reception system and a method of using the same.
[Advantageous Effects]
In accordance with the present invention, as the security server intermediates transmission/reception of security data between a service providing server and a user terminal, a limitation of installing the certificates on the service providing server may be prevented.

Also, since the entire data included in a web page are not encoded and only security data are encoded, data bandwidth may be decreased.

BEST MODE

In accordance with one aspect of the present invention, there is provided a security server for intermediating transmission/reception of security data between a service providing server and a user terminal. The security server is configured to: generate a session key corresponding to a secret key provided from a user terminal; receive security data together with the session key from a security data transmitter; encode the security data with the secret key corresponding to the session key; store the encoded security data; provide a data encryption key to the security data transmitter; decode the encoded security data with the secret key corresponding to the session key when the session key is received together with a security data request key from a security data receiver; and provide the decoded security data to the security data receiver.

In accordance with another aspect of the present invention, there is provided a system including a user terminal, a service providing server and a security server for intermediating transmission/reception of the security data between the user terminal and the service providing server. The security server is configured to: generate a session key corresponding to a secret key provided from the user terminal; receive security data together with the session key from a security data transmitter, which is one of the user terminal and the service providing server; encode the security data with the secret key corresponding to the session key; store the encoded security data; generate a data key of the security data; generate a data encryption key by encoding the data key with the secret key; provide the data encryption key to a security data transmitter; decode the encoded security data with the secret key corresponding to the session key when the session key is received together with the security data request key from the security data receiver, which is a different one of the user terminal and the service providing server; and provide the decoded security data to the security data receiver. Further, the user terminal is configured to: generate the secret key; transmit the session key and the security data in case of the security data transmitter; provide the data encryption key to the service providing server; receive the data encryption key from the service providing server in case of the security data receiver; transmit the session key and the security data request key to the security server; and receive the decoded security data from the security server. Moreover, the service providing server is configured to: transmit the session key and the security data to the security server; provide the data encryption key transmitted from the security server in case of the security data transmitter; receive the session key and the data encryption key from the user terminal; transmit the session key and the security data request key to the security server; and receive the decoded security data from the security server in case of the security data receiver.

In accordance with another embodiment of the present invention, there is provided a method of intermediating transmission/reception of security data between a service providing server and a user terminal, comprising the steps of: generating a session key corresponding to a secret key provided form the user terminal; providing the session key to the user terminal; receiving security data together with the session key from a security data transmitter, which is one of the user terminal and the service providing server; encoding the security data with the security key corresponding to the session key; generating a data key of the encoded security data; encoding the data key with the secret key to generate a data encryption key; providing the data encryption key to the security data transmitter; associating and storing the secret key, the session key, the data key and the encoded security data; decoding the encoded security data with the secret key corresponding to the session key when the session key and a security data request key are received from a security data receiver, which is one of the service providing server and the user terminal; and providing the security data to the security data receiver.

[Mode for Invention]

Hereinafter, various embodiments of the present invention will be described in detail with reference to the accompanying drawings. However, in case of having possibility of unnecessarily making the subject matter of the present invention to be indefinite, a detailed description of well-known functions or configurations will be omitted.

Figure 1:
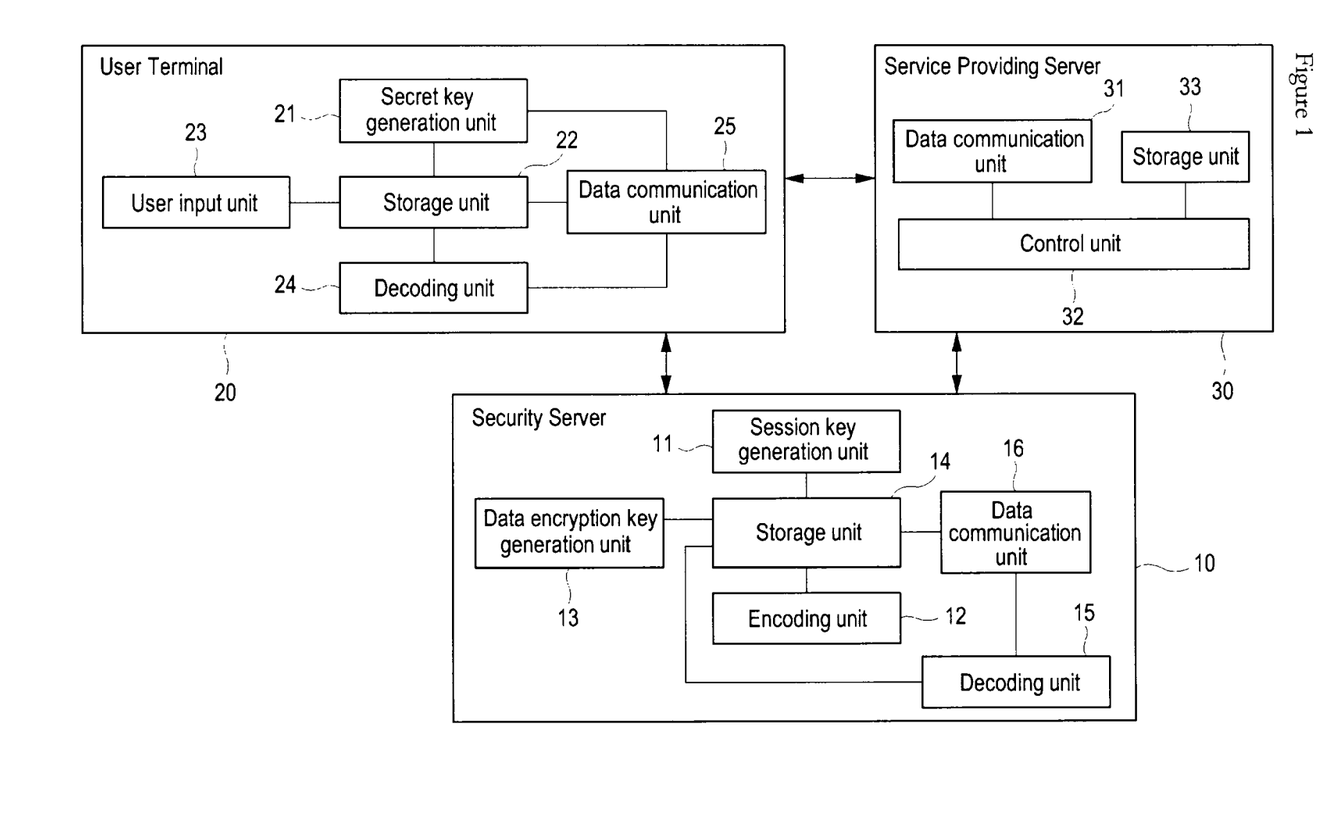
FIG. 1 is a block diagram showing a security server and a security data transmission/reception system including the same in accordance with one embodiment of the present invention.
Figure 2:
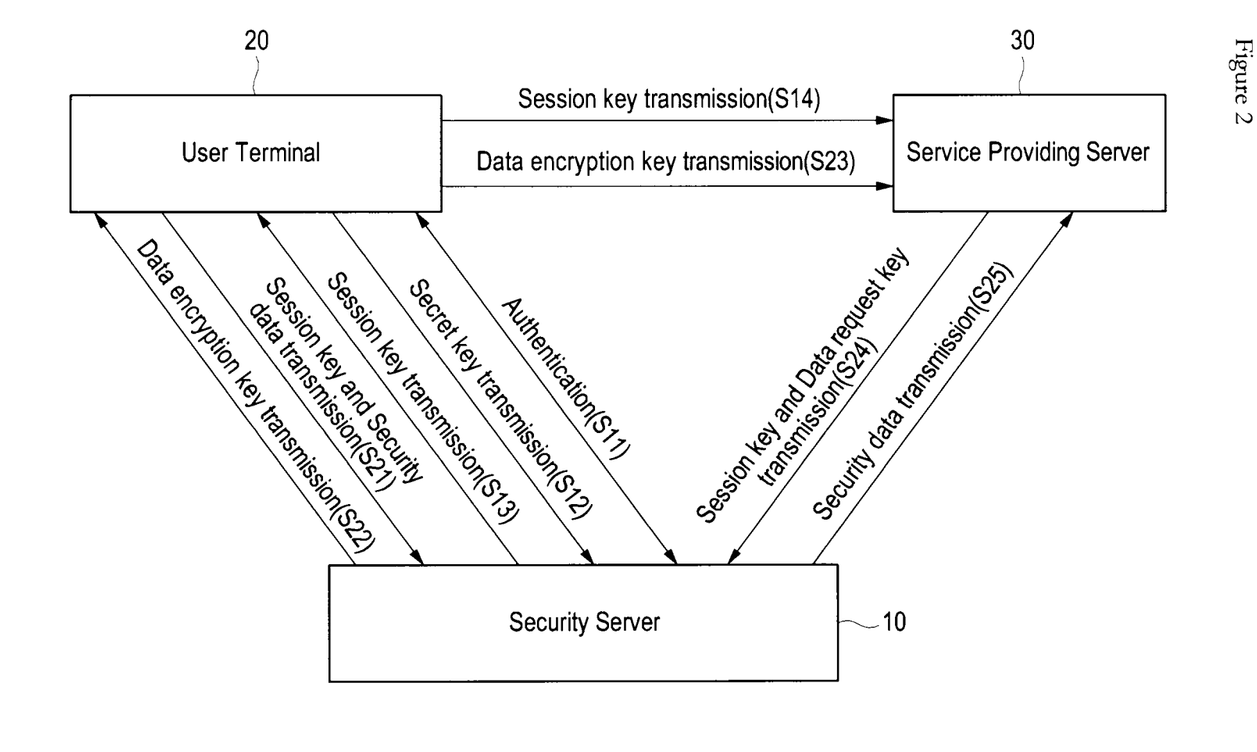
FIGS. 2 and 3 are schematic diagrams showing security data transmission/reception methods in accordance with embodiments of the present invention.
Figure 3:
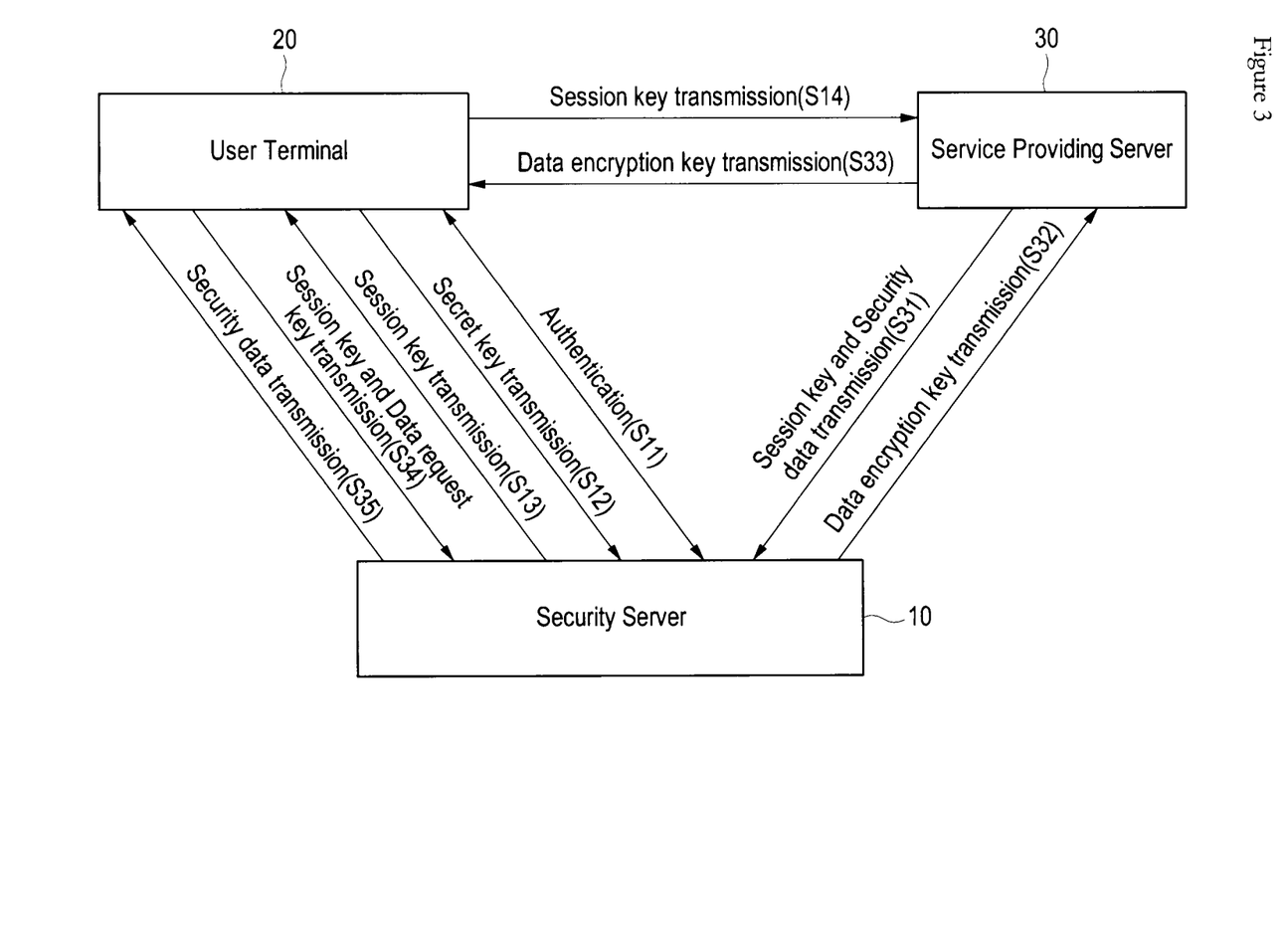

Referring to FIGS. 1 to 3, a security server 10 may provide intermediate security data transmission/reception between a user terminal 20 and a service providing server 30 in accordance with one embodiment of the present invention. The security data may include personal information such as a user name, a resident registration number, a telephone number and a password, as well as any data that needs to be secured such as account information. The security data are not limited to the above examples. The security data may include data promised to be secured between the user terminal 20 and the service providing server 30, as well as the entire data requested to be secured by the user terminal 20. The user terminal 20 may be a security data transmitter. Further, the service providing server 30 may be a security data receiver according to a preset service implementing procedure. Also, the inverse may be possible.

The user terminal 20 may be chosen from various communication devices such as a personal computer (PC), a personal digital assistance (PDA), a cell phone and the like, which access the service providing server 30 and receive a variety of contents therefrom. The service providing server 30, which is a server capable of providing request services (contents) of the user terminal 20 accessed thereto (logged-in), may be an on-line market managing server, a banking server, a public office server or the like. The security server 10, the user terminal 20 and the service providing server 30 may transmit/receive data based on the World Wide Web.

Referring to FIGS. 2 and 3, at an early stage of access between the user terminal 20 and the service providing server 30 or when a security data transmitting/receiving event between the user terminal 20 and the service providing server 30, e.g., a request of a web page in which the security data are written or to be written occurs, entity authentication between the security server 10 and the user terminal 20 may be performed at step S11. If the authentication is completed, then the security server 10 may receive a secret key from the user terminal 20 at step S12.

A session key generation unit 11 in the security server 10 may generate a session key corresponding to the secret key transmitted from the user terminal 20. The session key, which is a specific value for referring to the secret key, plays the role of an essential key in transmitting/receiving and requesting security data. The security server 10 transmits the session key to the user terminal 20 at step S13 and the user terminal 20 transmits the session key to the service providing server 30.

Figure 4:
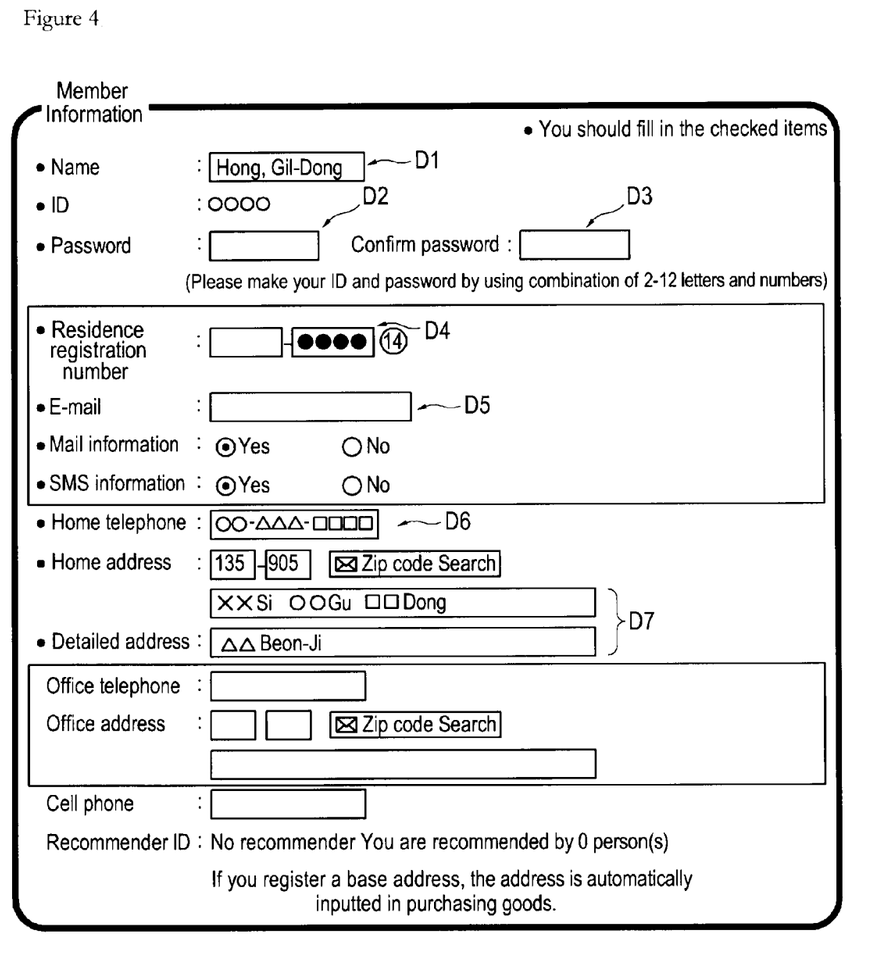
FIG. 4 is an exemplary diagram showing security data inputted from a user terminal, which is a security data transmitter, through a web page and transmitted to a security server.

The security server 10 receives the security data together with the session key from the security data transmitter, which is one of the user terminal 20 and the service providing server 30, at steps S21 and S31. As shown in FIG. 4, when the user terminal 20 is the security data transmitter, the security data D1 to D7 inputted through the web page are transmitted to the security server 10. The security data D1 to D7 inputted from the user terminal 20 are transmitted to the security server 10 together with the session key.

Figure 5:
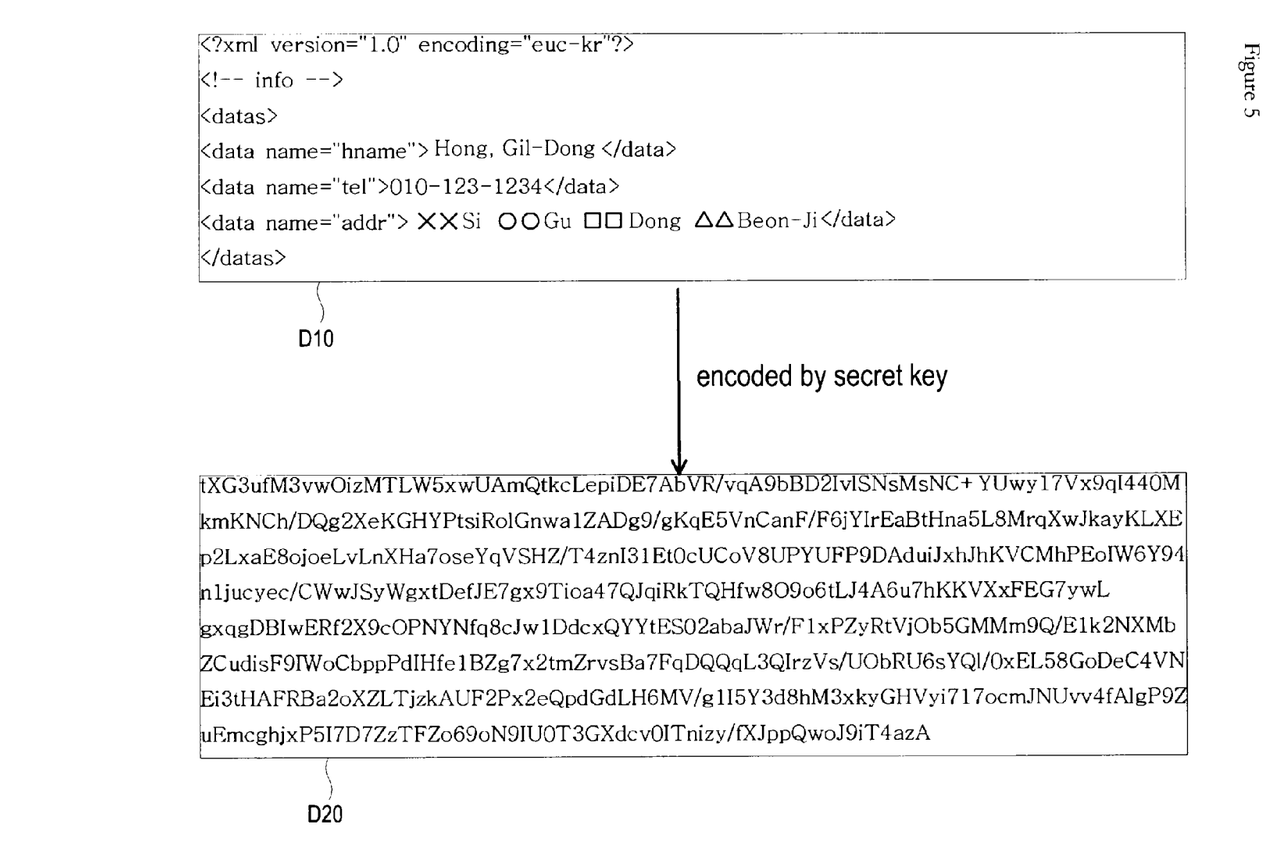
FIG. 5 is a diagram showing examples of security data inputted from a security data transmitter in an HTML format and encoded security data.

If the security data are transmitted from the security data transmitter together with the session key at steps S21 and S31, then an encoding unit 12 of the security server 10 encodes the security data with the secret key corresponding to the transmitted session key. The encoding unit 12 encodes the security data in a Rijndael encryption way in accordance with one embodiment of the present invention. However, the encryption way is not limited thereto. FIG. 5 shows examples of security data D10 inputted from the security data transmitter in a hypertext markup language (HTML) format and security data D20 encoded with the secret key, which are to be stored in a storage unit 14. As shown in such a figure, the present invention encodes not the entire data included in the web page but only the security data. This is so that the bandwidth of the data may be reduced.

The data encryption key generation unit 13 generates a data key as a specific value for referring to the encoded security data and a data encryption key by encoding the data key with the secret key. The data encryption key generation unit 13 also encodes the data key in the Rijndael encryption way to generate the data encryption key in accordance with one embodiment of the present invention. The data encryption key is transmitted from the security server 10 to the security data transmitter and then transmitted from the security data transmitter to the security data receiver. For example, when the security data transmitter is the user terminal 20 and the security data receiver is the service providing server 30 as shown in FIG. 2, the data encryption key is transmitted from the security server 10 to the user terminal 20 at step S22 and then transmitted from the user terminal 20 to the service providing server 30 at step S23. The data encryption key is recorded at a hidden field of the web page to be transmitted from the user terminal 20 to the service providing server 30. As shown in FIG. 3, when the security data transmitter is the service providing server 30 and the receiver is the user terminal 20, the data encryption key is transmitted from the security server 10 to the service providing server 30 and then security data are transmitted to the user terminal 20 at steps S32 and S33.

Referring back to FIG. 1, the storage unit 14 of the security server 10 stores the secret key, the session key, the data key, the data encryption key and the encoded security data, which are associated with each other.

Figure 6:
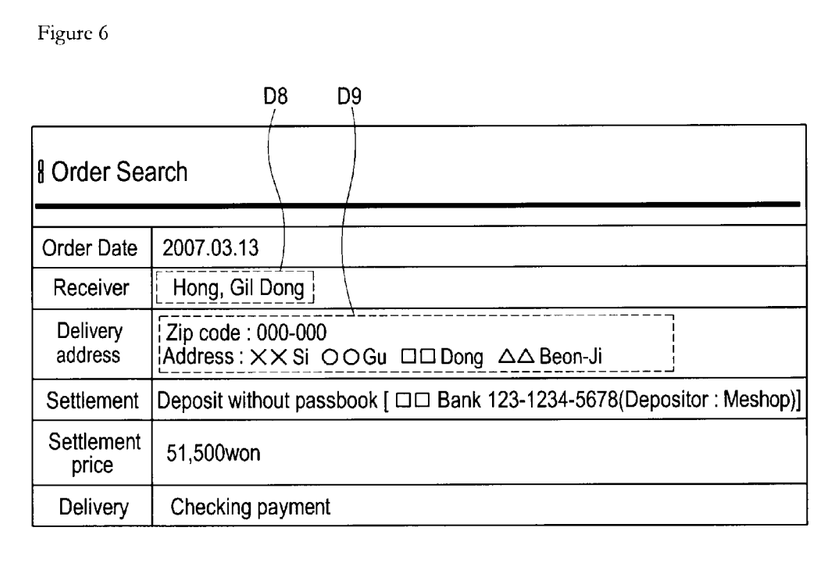
FIG. 6 is a diagram showing an example of displaying secure data transmitted to a user terminal, which is a security data receiver, through a security server on a web page.

If the session key together with a security data request key is received from the security data receiver, then the decoding unit 15 of the security server decodes the encoded security data with the secret key corresponding to the session key. For example, if the data encryption key as the security data request key together with the session key is received from the service providing unit 30, which is the security data receiver as shown in FIG. 2 at step S24, or if the data key as the security data request key together with the session key is received from the user terminal 20, which is the security data receiver as shown in FIG. 3 at step S34, then the decoding unit 15 retrieves the secret key corresponding to the session key transmitted from the security data receiver and decodes the encoded security data with the retrieved secret key. In accordance with one embodiment of the present invention, the security data decoded by the decoding unit 15 may be security data represented by an extensible markup language (XML). The decoded security data are transmitted to the security data receiver at steps S25 and S35. FIG. 6 shows an example displaying the security data D8 and D9 transmitted from the security server 10 to the user terminal 20 on a web page when the service providing server 30 is the security data transmitter and the user terminal 20 is the security data receiver.

A data communication unit 16 transmits/receives the security key and the session key to/from the user terminal 20, transmits/receives the security data and the data encryption key to/from the security data transmitter, and transmits/receives the session key, security data request key and the security data to/from the security data receiver. It is preferable that the data communication 16 communicates with the user terminal 20 and the service providing server 30 based on secure sockets layer (SSL).

The session key generation unit 11, the encoding unit 12, the data encryption key generation unit 13 and the decoding unit 15 of the security server 10, which are mentioned above, may be embodied as independent devices or one or more devices. For example, the session key generation unit 11, the encoding unit 12, the data encryption key generation unit 13 and the decoding unit 15 may be embodied as a single processor for performing the functions of session key generation, encoding, data encryption key generation and decoding by individual modules.

Referring to FIG. 1 once again, the secret key generation unit 21 generates the secret key to be provided to the security server 10 as a pseudorandom number. The secret key, which is an encryption key between the security server 10 and the user terminal 20, is used to encode and decode the security data and the data encryption key.

The storage unit 22 stores the secret key, the session key and the security data provided from the security server 10. The security data, which are stored in the storage unit 22, include the security data transmitted to the service providing server 30 via the security server 10 when the user terminal 20 is the security data transmitter, as well as the security data inputted from the service providing server 30 via the security server 10 when the user terminal is the security data receiver. Also, when the user terminal 20 is the security data transmitter, the storage unit 22 may temporarily store the security data inputted from the user input unit 23.

When the user terminal is the security data receiver, the decoding unit 24 decodes the data encryption key transmitted from the service providing server 30 with the secret key to thereby extract the data key from the data encryption key. As mentioned above, this data key is used as the data request key.

The data communication unit 25 transmits/receives at least one of the secret key, the session key, the security data, the data encryption key and the security data request key to/from the security server 10 based on SSL. Also, the data communication unit 25 transmits/receives the session key and the data encryption key to/from the service providing server 30 based on transmission control protocol/Internet protocol (TCP/IP).

The user terminal 20 may include a display unit (not illustrated in FIG. 1) for displaying contents provided from the service providing server 30. Also, the user terminal 20 may include a control unit for controlling the secret key generation unit 21, the storage unit 22, the user input unit 23, the decoding unit 24 and the data communication unit 25. As mentioned above, when the security data decoded by the decoding unit 15 of the security server 10 is represented by XML, the control unit may play the role of an XML parser. Further, the user terminal 20 may include an additional XML parser according to another embodiment of the present invention. The secret key generation unit 21 and the decoding unit 24 may be embodied as individual devices or as one device. For example, the secret key generation unit 21 and the decoding unit 24 may be embodied as a signal processor performing the functions of the secret key generation and the decoding by individual modules.

Referring to FIG. 1, the data communication unit 31 of the service providing server 30 communicates with the security server 10 based on SSL under the control of the control unit 32 to thereby transmit/receive the session key, the data encryption key and the security data. It then communicates with the user terminal 20 based on TCP/IP to thereby transmit/receive the session key and the data encryption key.

The storage unit 33 stores the security data to be provided to the user terminal 20 via the security server 10, the session key transmitted from the user terminal 20, and a variety of content information provided to the user terminal 20 under the control of the control unit 32. The storage unit 33 stores the data encryption key to be transmitted from the security server 10 when the service providing server 30 is the security data transmitter. The storage unit 33 stores the data encryption key transmitted from the user terminal 20 and the security data transmitted from the security server 10 when the service providing server 30 is the security data receiver.

In accordance with another embodiment of the present invention, a method of intermediating transmission/reception of the security data between the user terminal and the service providing server, which are mentioned above, may be a storage media configured to record computer readable instructions.

Although embodiments have been described with reference to a number of illustrative embodiments thereof, it should be understood that numerous other modifications and embodiments can be devised by those skilled in the art that will fall within the spirit and scope of the principles of this disclosure. Also, these variations and modifications are possible within the scope of the appended claims.

[Industrial Applicability]

As the security server for intermediating transmission/reception of the security data between the user terminal and the service providing server is equipped, the burden created due to the installation of certificates on the service providing server may be reduced.

The invention claimed is:

1. A system including a user terminal, a service providing server and a security server for intermediating at least one of transmission and reception of security data between the user terminal and the service providing server, comprising:

the security server configured to generate a session key corresponding to a secret key provided from the user terminal, receive security data together with the session key from a security data transmitter, which is one of the user terminal and the service providing server, encode the security data with the secret key corresponding to the session key, store the encoded security data, generate a data key of the security data, generate a data encryption key by encoding the data key with the secret key, provide the data encryption key to a security data transmitter, decode the encoded security data with the secret key corresponding to the session key when the session key is received together with the security data request key from the security data receiver, which is the other one of the user terminal and the service providing server, and provide the decoded security data to the security data receiver;

the user terminal configured to generate the secret key, transmit the session key and the security data and provide the data encryption key to the service providing server in case of the security data transmitter, and receive the data encryption key from the service providing server, transmit the session key and the security data request key to the security server and receive the decoded security data from the security server in case of the security data receiver; and the service providing server configured to transmit the session key and the security data to the security server and provide the data encryption key transmitted from the security server in case of the security data transmitter, receive the session key and the data encryption key from the user terminal, transmit the session key and the security data request key to the security server and receive the decoded security data from the security server in case of the security data receiver.

2. The system of claim 1, wherein the security data request key is the data encryption key transmitted from the service providing server or the data key extracted from the data encryption key decoded with the secret key, and wherein the data encryption key is received by the user terminal from the service providing server.

3. The system of claim 2, wherein the security server includes:
   a session key generation unit configured to generate the session key corresponding to the secret key provided from the user terminal;
   an encoding unit configured to encode the security data received together with the session key from the security data transmitter, which is one of the user terminal or the service providing server, with the secret key corresponding to the session key;
   a data encryption key generation unit configured to generate a data key of the encoded security data and encode the data key with the secret key to generate the data encryption key;
   a storage unit configured to store the secret key, the session key, the data key and the encoded security data, which are associated with each other;
   a decoding unit configured to decode the encoded security data with the secret key corresponding to the session key when the session key is received together with the security data request key from a security data receiver, which is one of the service providing server and the user terminal; and
   a first data communication unit configured to at least one of transmit and receive the session key and the secret key to or from the user terminal, at least one of transmit and receive the security data and the data encryption key to or from the security data transmitter, and at least one of transmit and receive the security data, the session key and the security data request key to or from the security data receiver.

4. The system of claim 3, wherein the user terminal includes:
   a secret key generation unit configured to generate the secret key;
   a storage unit configured to store the secret key, the session key and the security data;
   a decoding unit configured to decode the data encryption key provided from the service providing server with the secret key to extract the data key; and
   a second data communication unit configured to at least one of transmit and receive at least one of the secret key, the session key, the security data, the data encryption key and the security data request key to or from the security server, and at least one of transmit and receive at least one of the session key and the security data request key to or from the service providing server.

5. The system of claim 3, wherein the service providing server includes:
   a third data communication unit configured to at least one of transmit and receive the session key, the data encryption key and the security data to or from the security server, and at least one of transmit and receive the session key and the data encryption key to or from the user terminal;
   a storage unit configured to store the security data to be provided to the user terminal via the security server, the data encryption key provided from the security server, the data encryption key transmitted from the user terminal and the security data transmitted from the security server; and
   a control unit configured to control the third data communication unit and the storage unit.

6. The system of claim 3, wherein the user terminal and the service providing server are configured to communicate with the security server based on secure sockets layer (SSL), and wherein the user terminal and the service providing server are configured to communicate with each other based on transmission/control protocol/Internet protocol.

* * * * *

UNITED STATES PATENT AND TRADEMARK OFFICE
CERTIFICATE OF CORRECTION

PATENT NO. : 8,549,283 B2  
APPLICATION NO. : 12/097382  
DATED : October 1, 2013  
INVENTOR(S) : Seong Jin Lim Page 1 of 1

It is certified that error appears in the above-identified patent and that said Letters Patent is hereby corrected as shown below:

Title Page, item (75), change "Jin Seong Lim" to --Seong Jin Lim--.

Signed and Sealed this  
Thirteenth Day of May, 2014

Michelle K. Lee  
*Deputy Director of the United States Patent and Trademark Office*